J. SPŸKER.
CONSTRUCTION OF ELASTIC WHEELS.
APPLICATION FILED JUNE 9, 1909.
972,725. Patented Oct. 11, 1910.
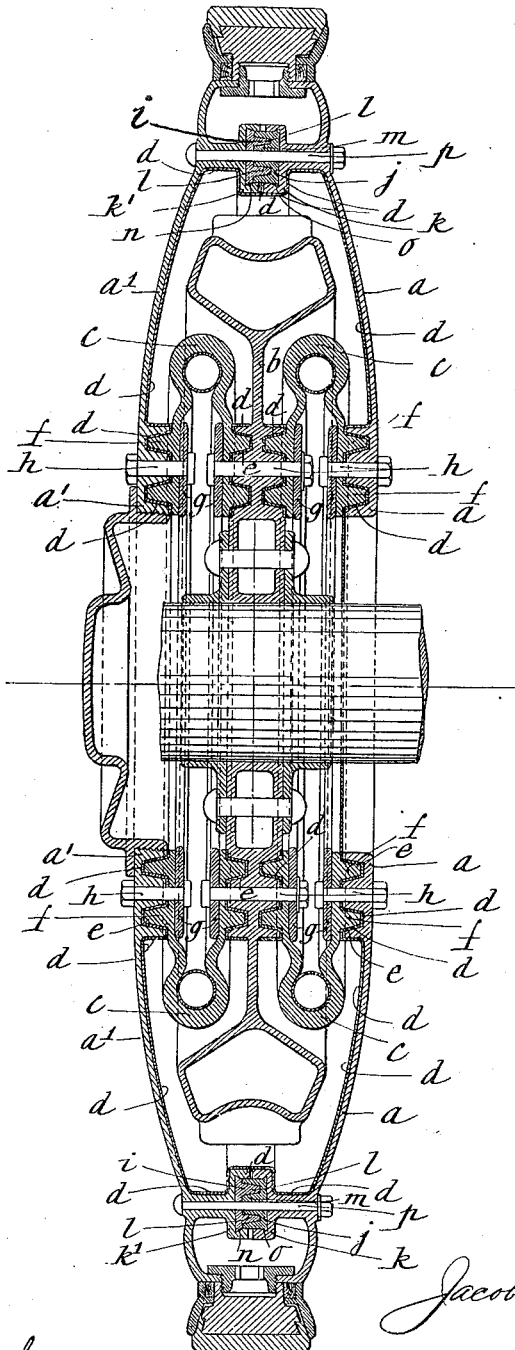

UNITED STATES PATENT OFFICE.

JACOBUS SPYKER, OF AMSTERDAM, NETHERLANDS.

CONSTRUCTION OF ELASTIC WHEELS.

972,725.  Specification of Letters Patent.  Patented Oct. 11, 1910.

Application filed June 9, 1909. Serial No. 501,013.

*To all whom it may concern:*

Be it known that I, JACOBUS SPYKER, a subject of the Queen of the Netherlands, and residing at 141 Wesperzyde, Amsterdam, Netherlands, have invented certain new and useful Improvements in the Construction of Elastic Wheels, of which the following is a specification.

This invention relates to the construction of elastic wheels having pneumatic chambers, formed of combined rigid and flexible elements, and having no independent air chamber of india-rubber or the like.

The object of the invention is to obtain a perfectly hermetic connection between the rigid and the flexible parts, and the formation of a rigid casing as hereinafter described consisting of several parts.

The invention essentially consists in covering the interior walls of a rigid casing forming the wheel or parts of this casing with a layer of india-rubber which is preferably vulcanized to the wall (the latter being preferably of sheet steel, aluminium or other suitable material) and in interposing between the rigid elements and also between the rigid and flexible elements, packing rings of india-rubber which are pressed by means of tightening bolts into recesses of corresponding shape, also covered with a layer of india-rubber vulcanized to its support, so that a tight joint is obtained in which conical projections of india-rubber fit into corresponding seats covered with india-rubber whereby a perfectly durable hermetic joint is assured even in the event of a slight loosening of the tightening devices, inasmuch as the surfaces of india-rubber, penetrate, interengage and wedge together, thus offering great resistance to internal pressure.

Reference will now be made to the accompanying drawing, which shows by way of example a wheel constructed according to the invention, in transverse section.

In constructing a wheel according to the invention it has a pneumatic chamber formed partly of a rigid casing, $a$, $a'$ of sheet steel, aluminium, steel plates, or the like, a metal supporting or guiding buffer having a rigid wall, $b$, and flexible bands $c\ c$ of india-rubber or the like.

On the interior walls of the casing $a\ a'$, a layer of india-rubber $d\ d$ is applied and is then vulcanized thereon, so that it will securely adhere to the metal. This is effected at all parts, for example at $b$, which have to come into contact with the india-rubber connecting devices of the flexible bands $c$ or with special jointing devices arranged between the rigid parts when the latter are made in several pieces. The flexible india-rubber bands $c$ terminate in circular projections or ribs $f$ of conical section corresponding to circular converging recesses $e$ formed in the rigid pieces $a$ and $b$, so that owing to the tightening of the circular plates $g$ by means of bolts $h$, the projections $f$ are firmly pressed into their conical seats also lined with india-rubber $d$. The tightening of rubber to rubber forms a perfectly hermetic joint between the flexible bands $c$ and the rigid walls $b$ and $a\ a'$.

For convenience of manufacture it is an advantage to form the rigid casing in two pieces of "drawn sheet steel." In order to obtain a perfect joint between the two halves, a joint similar to that described with reference to the connection of the flexible bands may be utilized. For this purpose the two halves of the casing each provided with grooved circular rims $k\ k'$ within and between which are arranged india-rubber rings $i$, $j$, provided with corresponding conical projections and recesses $l\ m$ engaging one another. The rings are preferably dovetailed as shown at $n$, $o$, and the rims $k$, $k'$ which receive them are correspondingly undercut.

The india-rubber covering $d\ d$ vulcanized on $a\ a'$, surrounds the edges of the rims $k\ k'$, the latter being covered or lined to a certain extent thereby. The tightening of the bolts $p$ arranged at various points around the wheel, effects an intimate tightening of the parts $a\ a'$ and of the rims $k\ k'$ so that the joint will be perfectly hermetic.

Having now described my invention what I claim as new and desire to secure by Letters Patent is:—

1. An elastic wheel comprising in combination, a pneumatic chamber formed of metallic disks provided adjacent to the inner edge thereof with conical grooves and having flexible rubber connections, and rubber vulcanized on the interior thereof, adapted to interlock with the flexible connection and retain the elements in their operative position.

2. An elastic wheel comprising, in combination, a pneumatic chamber composed of rigid and flexible elements, a rubber lining vulcanized on said rigid elements, projecting and circularly extending lugs formed on said rigid member, similar elements formed on said flexible member aforesaid, said lugs adapted to interlock, and means whereby said lugs are retained in this position.

3. In an elastic wheel, a pneumatic chamber comprising rigid elements, a rubber lining vulcanized to said elements, and flexible connections for said rigid elements.

4. In an elastic wheel, a pneumatic chamber comprising, in combination, a plurality of rigid disks, a rubber lining vulcanized thereto, flexible elements coöperating with said rigid elements adapted to connect said rigid elements with a nave.

5. In an elastic wheel, a pneumatic chamber composed of rigid members in halves, flexible members connecting said rigid members, interlocking substantially conical connections between said rigid and flexible elements, and a rubber lining vulcanized to said rigid elements, said lining completing the air tight joint between said rigid and flexible elements.

In testimony whereof I affix my signature in presence of two witnesses.

JACOBUS SPŸKER.

Witnesses:
D. J. NANDS,
A. HUIDEKOPER.